US007738361B2

(12) United States Patent
Zinser, Jr. et al.

(10) Patent No.: US 7,738,361 B2
(45) Date of Patent: Jun. 15, 2010

(54) METHOD AND APPARATUS FOR GENERATING FILL FRAMES FOR VOICE OVER INTERNET PROTOCOL (VOIP) APPLICATIONS

(75) Inventors: Richard L. Zinser, Jr., Niskayuna, NY (US); Martin W. Egan, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 243 days.

(21) Appl. No.: 11/940,591

(22) Filed: Nov. 15, 2007

(65) Prior Publication Data

US 2009/0132246 A1    May 21, 2009

(51) Int. Cl.
    *G06F 11/00* (2006.01)
(52) U.S. Cl. .................. 370/216; 370/351; 370/352
(58) Field of Classification Search .......... 370/216, 370/351, 352
See application file for complete search history.

(56) References Cited

U.S. PATENT DOCUMENTS

| 5,615,214 | A | * | 3/1997 | Chandos et al. ............. 370/349 |
| 6,067,511 | A | | 5/2000 | Grabb et al. |
| 6,073,093 | A | | 6/2000 | Zinser, Jr. et al. |
| 6,078,880 | A | | 6/2000 | Zinser, Jr. et al. |
| 6,081,776 | A | | 6/2000 | Grabb et al. |
| 6,081,777 | A | | 6/2000 | Grabb |
| 6,094,629 | A | | 7/2000 | Grabb et al. |
| 6,098,036 | A | | 8/2000 | Zinser, Jr. et al. |
| 6,119,082 | A | | 9/2000 | Zinser, Jr. et al. |
| 6,138,092 | A | | 10/2000 | Zinser, Jr. et al. |
| 6,549,886 | B1 | | 4/2003 | Partalo |
| 6,584,104 | B1 | * | 6/2003 | McGowan ................. 370/394 |
| 2003/0161310 | A1 | * | 8/2003 | Dobbins et al. ............. 370/392 |
| 2005/0010401 | A1 | * | 1/2005 | Sung et al. ................. 704/219 |
| 2005/0044471 | A1 | * | 2/2005 | Chia et al. ................. 714/776 |
| 2005/0049853 | A1 | * | 3/2005 | Lee et al. ................... 704/201 |

OTHER PUBLICATIONS

Perkins, Colin et al "A Survey of Packet Loss Recovery Techniques for Streaming Audio." IEEE Network—Sep./Oct. 1998.*

(Continued)

*Primary Examiner*—Dang T Ton
*Assistant Examiner*—Robert M Morlan
(74) *Attorney, Agent, or Firm*—Ronald E. Prass, Jr.; Prass LLP

(57) ABSTRACT

A method and apparatus that generates fill frames for Voice over Internet Protocol (VoIP) applications in a communication device is disclosed. The method may include determining if there is a lost frame in a received communication, wherein if it is determined that there is a lost frame, setting a frame loss flag and storing the frame loss flag in the frame loss history register, shifting a loss history register, a line spectral frequency (LSF) history register, a voicing cutoff (VCUT) history register, a pitch history register, and a root mean squared (RMS) gain history register, wherein the loss history register, the LSF history register, the VCUT history register, the pitch history register, and the RMS history register include at least three registers, the three registers being a newest, a middle and an oldest registers, reading the frame loss flag into a newest loss history register, determining contents of the middle register of each of the LSF history register, the VCUT history register, the pitch history register, and the RMS history register, and sending the contents of the middle registers to a synthesizer to generate an output speech signal.

18 Claims, 5 Drawing Sheets

OTHER PUBLICATIONS

International Search Report for related application No. PCT/US2008/083299; dated Dec. 29, 2008.

http://www.globalipsound.com/datasheets/NetEQ.pdf.

ITU-T Recommendation G.729, International Telecommunications Union, Mar. 1996, pp. 31-32.

ITU-T Recommendation G.729 Annex D, International Telecommunications Union, Sep. 1998, p. 3.

ITU-T Recommendation G.729 Annex E, International Telecommunications Union, Sep. 1998, pp. 17-18.

ITU-T Recommendation G.711 Appendix I, International Telecommunications Union, Sep. 1999.

* cited by examiner

METHOD AND APPARATUS FOR GENERATING FILL FRAMES FOR VOICE OVER INTERNET PROTOCOL (VOIP) APPLICATIONS

BACKGROUND OF THE DISCLOSURE

1. Field of the Disclosure

The disclosure relates to Voice over Internet Protocol (VoIP) telephone communications.

2. Introduction

VoIP packets are usually sent using a "fire and forget" protocol, User Datagram Protocol (UDP) or User Datagram Protocol/Realtime Transport Protocol (UDP/RTP). UDP has no retransmission (nor any other error control mechanism) to fix errors or replace lost packets. In fact, UDP packet delivery is not guaranteed, and packets may be dropped when a network becomes congested. Thus, the main cause of voice quality degradation in VoIP systems arises from lost and late packets. If nothing is done to mitigate the loss, it is possible that gaps, additional delay, and garbled speech can result.

SUMMARY OF THE DISCLOSURE

A method and apparatus that generates fill frames for Voice over Internet Protocol (VoIP) applications in a communication device is disclosed. The method may include determining if there is a lost frame in a received communication, wherein if it is determined that there is a lost frame, setting a frame loss flag and storing the frame loss flag in the frame loss history register, shifting a loss history register, a line spectral frequency (LSF) history register, a voicing cutoff (VCUT) history register, a pitch history register, and a root mean squared (RMS) gain history register, wherein the loss history register, the LSF history register, the VCUT history register, the pitch history register, and the RMS history register include at least three registers, the three registers being a newest, a middle and an oldest registers, reading the frame loss flag into a newest loss history register, determining contents of the middle register of each of the LSF history register, the VCUT history register, the pitch history register, and the RMS history register, and sending the contents of the middle registers to a synthesizer to generate an output speech signal.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure concerns a method and apparatus for generating fill frames for Voice over Internet Protocol (VoIP) applications, such as the Time Domain Voicing Cutoff (TDVC) speech decoder, for example. Fill frames may be used when TDVC is operating in a VoIP environment to replace the speech segments associated with lost packets. A fill frame may be generated by using several different functions of TDVC's parameters, depending on the previously received packets and the state of the TDVC speech synthesizer, for example.

There are 4 parameter types that may be transmitted that control the TDVC speech synthesizer. They are: (1) Spectral parameters, in the form of Line Spectral Frequencies (LSF), for example. There may be ten of these transmitted for each frame; they are vector quantized using a multi-stage quantizer. (2) Voicing cutoff frequency, a 3-bit number (0-7) that may represent the transition point between voiced and unvoiced excitation in the frequency domain. (3) Fundamental pitch, the length (in samples) of the pitch period for voiced speech, for example. (4) The root mean squared (RMS) gain signal level for the frame. These parameters may be used to create a speech signal using a TDVC synthesizer, for example.

The TDVC parameter decoder may be used with the synthesizer of to generate fill frames. The incoming packet may be separated into the bits representing each parameter, with the bits being routed to the appropriate decoder. In addition, a flag indicating frame loss may be received. The outputs from all decoders (including the frame loss flag) may be fed to shift registers of length three. The registers may be shifted each time the decoding routine is entered. The outputs of each register may be connected to a selection/interpolation means, which is in turn may be controlled by the state of the frame loss flag registers.

Figure 1:
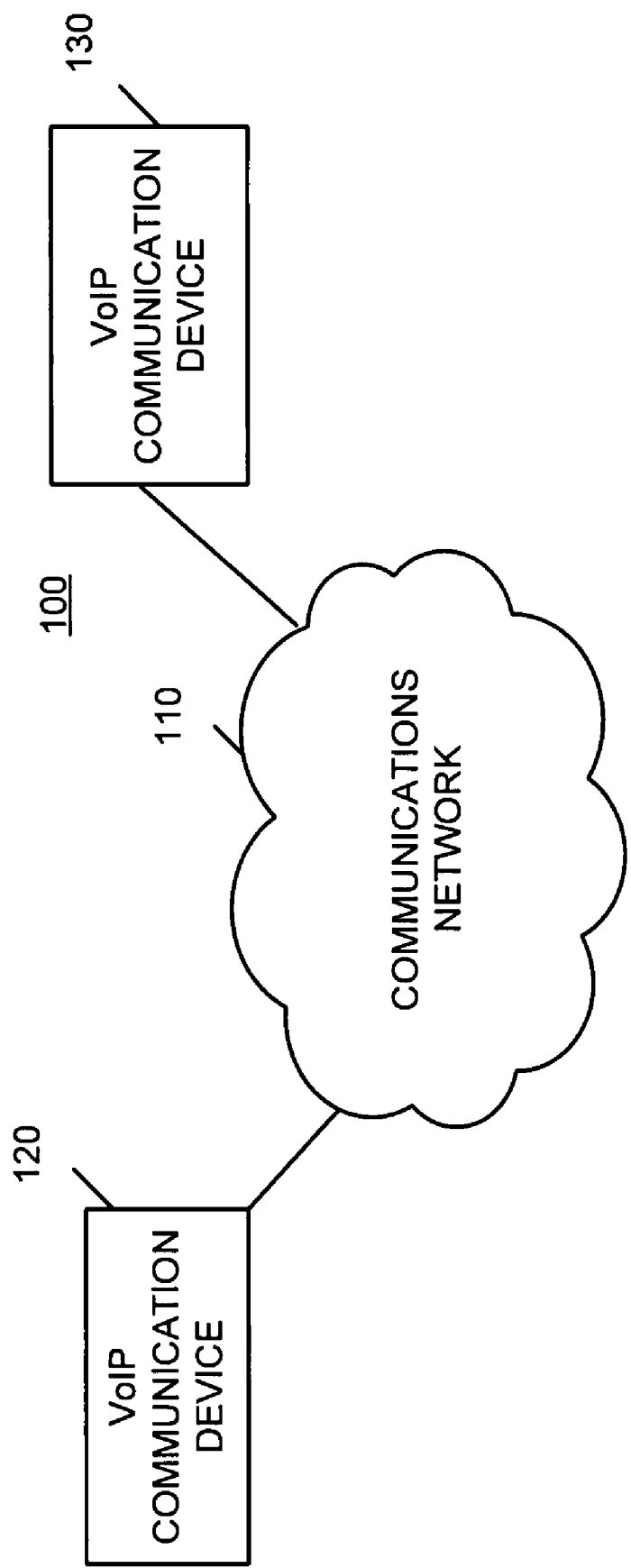
FIG. 1 illustrates an exemplary diagram of a VoIP communications network environment in accordance with a possible embodiment of the disclosure.

FIG. 1 illustrates an exemplary diagram of a VoIP communications network environment 100 in accordance with a possible embodiment of the disclosure. The VoIP communications network environment 100 may include a plurality of VoIP communication devices 120, 130 connected through a communications network 110.

Communications network 110 may represent any possible communications network that may handle VoIP telephonic communications, including wireless telephone networks, hardwired telephone networks, wireless local area networks (WLAN), the Internet, an intranet, etc., for example.

The VoIP communication device 120, 130 may represent any VoIP device capable of telephonic communications, including a telephone, server, personal computer, Voice over Internet Protocol (VoIP) telephone, etc., for example. Although only two VoIP communication devices 120, 130 is shown this is merely illustrative. There may be any number of VoIP communication devices 120, 130 in the VoIP communications network environment 100.

Figure 2:
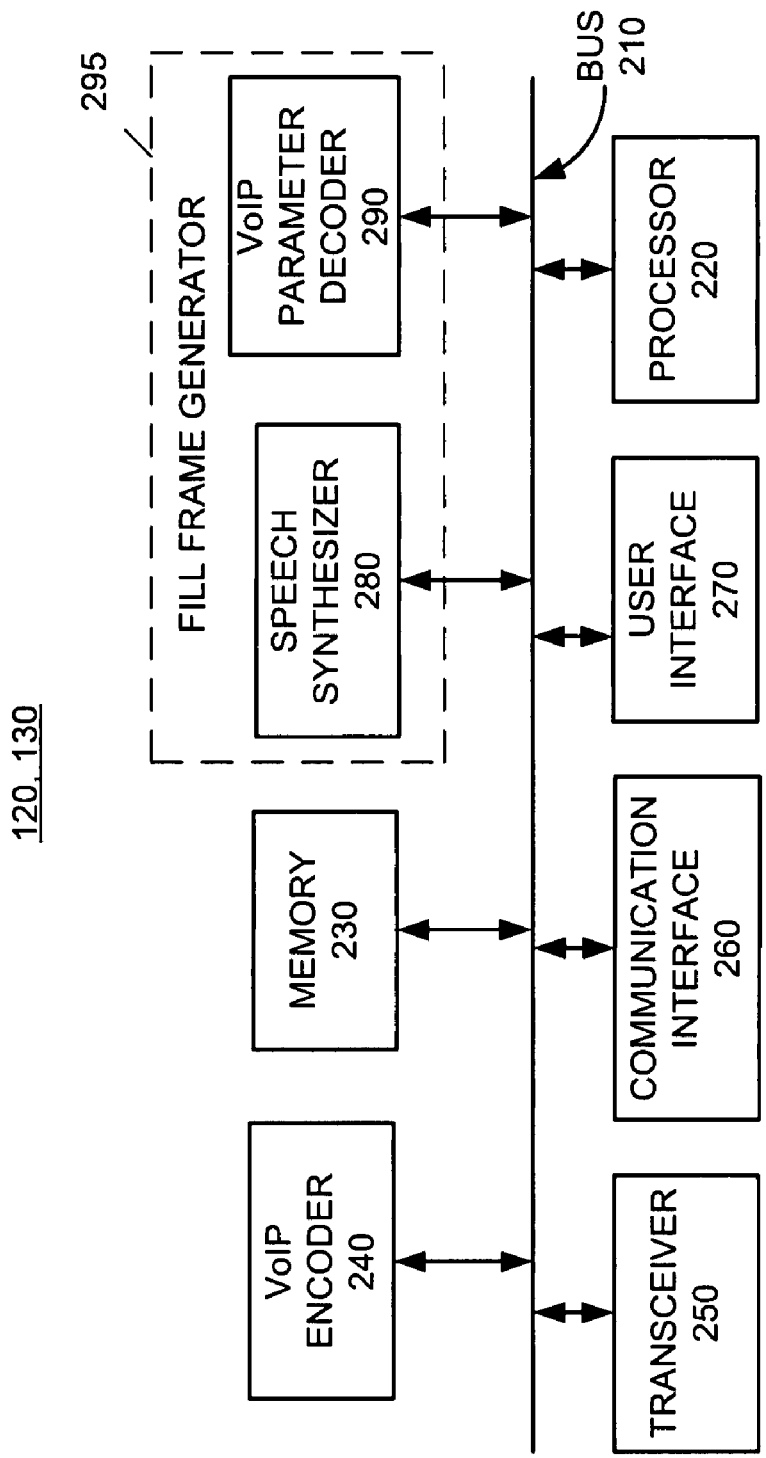
FIG. 2 illustrates a block diagram of an exemplary VoIP communication device in accordance with a possible embodiment of the disclosure.

FIG. 2 illustrates a block diagram of an exemplary VoIP communication device 120, 130 in accordance with a possible embodiment of the disclosure. The exemplary VoIP communication device 120, 130 may include a bus 210, a processor 220, a memory 230, a VoIP encoder 240, a transceiver 250, a communication interface 260, a user interface 270, and a fill frame generator 295 that may control a speech synthesizer 280 and a VoIP parameter decoder 290. Bus 210 may permit communication among the components of the VoIP communication device 120, 130.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

VoIP Encoder 240 may provide the means to convert an incoming digital audio stream into bits suitable for assembly into packets for transmission through transceiver 250 or communication interface 260.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network 110. In a wireless communication device 120, the transceiver 250 may transmit and receive transmissions directly or wirelessly via one or more of antennae, for example, in a manner known to those of skill in the art.

Communication interface 260 may include any mechanism that facilitates communication via the communications network 110. For example, communication interface 260 may include a modem. Alternatively, communication interface 260 may include other mechanisms for assisting the transceiver 250 in communicating with other devices and/or systems via wireless or hardwired connections.

User interface 270 may include one or more conventional input mechanisms that permit a user to input information, communicate with the VoIP communication device 120, 130 and/or present information to the user, such as a an electronic display, microphone, touchpad, keypad, keyboard, mouse, pen, stylus, voice recognition device, buttons, one or more speakers, etc.

The VoIP communication device 120, 130 may perform such functions in response to processor 220 and by executing sequences of instructions contained in a computer-readable medium, such as, for example, memory 230. Such instructions may be read into memory 230 from another computer-readable medium, such as a storage device or from a separate device via communication interface 260.

The operations and functions of the fill frame generator 295, and in particular, the speech synthesizer 280 and the VoIP decoder 290 will be discussed in relation to FIGS. 3-5.

Figure 3:
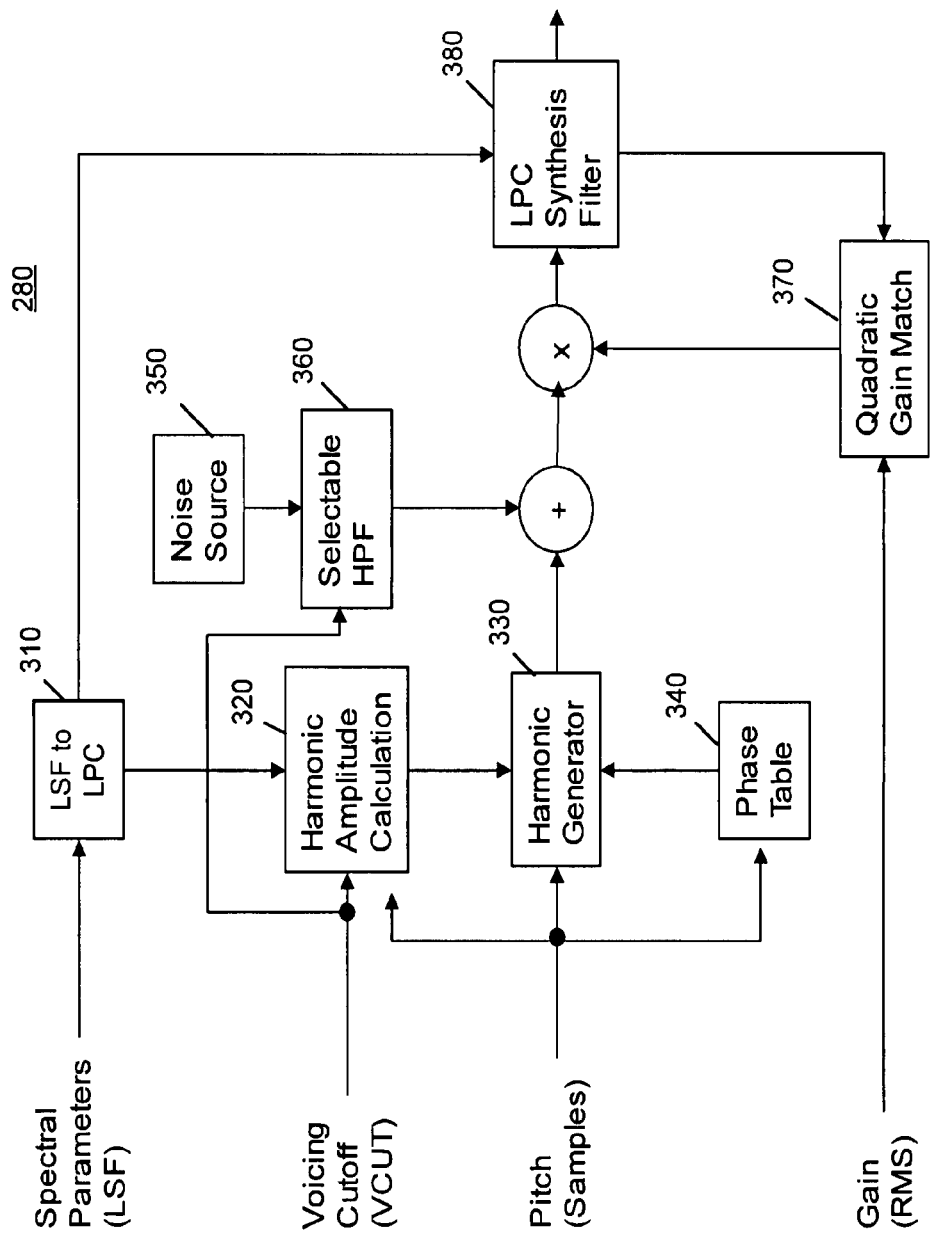
FIG. 3 illustrates an exemplary block diagram of a speech synthesizer in accordance with a possible embodiment of the disclosure.

FIG. 3 illustrates an exemplary block diagram of a speech synthesizer 280 in accordance with a possible embodiment of the disclosure. The speech synthesizer 280 may include an LSF to linear predictive coding (LPC) coefficient converter 310 which receives the LSF input, a harmonic amplitude calculation module 320 which receives the VCUT input, a harmonic generator 330 which receives the pitch input, a phase table 340 which provides input to the harmonic generator 330, a selectable high pass filter (HPF) 360, a noise source 350 which provides input to the selectable HPF 360, a quadratic gain match module 370 which receives the gain (RMS) input, and a linear predictive coding (LPC) synthesis filter 380 which outputs audio frames so they may be heard by a user of the VoIP communication device 120, 130.

The speech synthesizer 280 takes the four parameters (LSF, VCUT pitch, and gain) and produces audio signals. Spectral parameters, which are coded as line spectral frequencies (LSF), are converted to LPC coefficients, which in turn are used to form a tenth-order autoregressive filter that implements LPC synthesis.

The VCUT frequency may be the frequency below which we generate periodic excitation with period equal to the fundamental pitch, and above which we generate noise. Thus, the VCUT frequency may determine how much of the spectrum is harmonics and is periodic excitation and how much of it is noise. The harmonics and the noise may then be added together.

The next parameter that may be used is the fundamental pitch. The fundamental pitch may represent the frequency that vocal cords are disturbing the air flow generating the periodic excitation. Pitch may be measured in the number of samples between the principal excitation points. The RMS gain may represent how powerful or loud the signal is; it may which vary rapidly with time.

The speech synthesizer 280 is shown as an example. Any speech synthesizer 280 known to one of skill in the art that requires the LSF, VCUT, pitch, and RMS parameters as inputs will operate in conjunction with the speech parameter decoder 290 of this disclosure.

Figure 4:
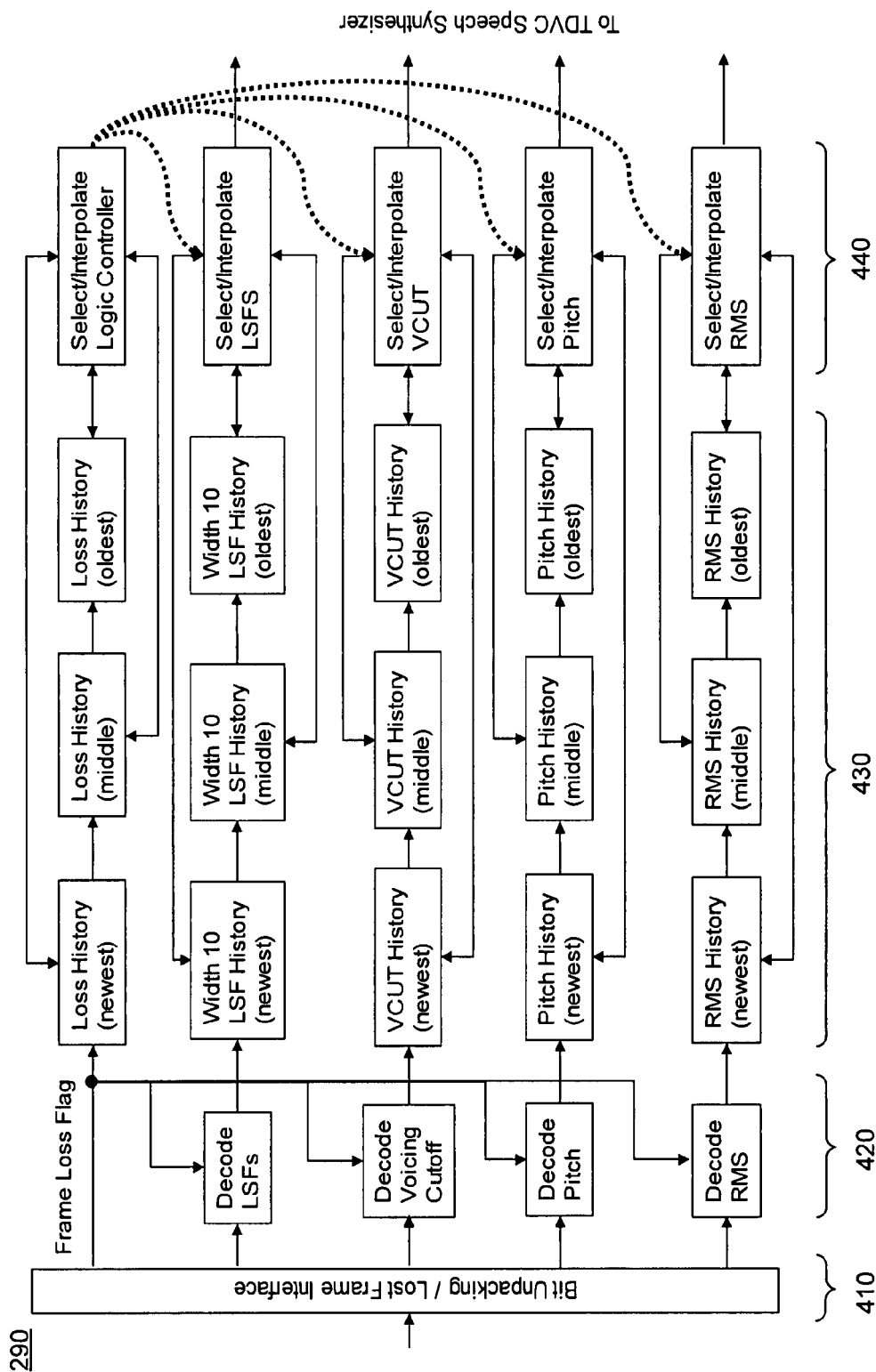
FIG. 4 illustrates an exemplary block diagram of a VoIP parameter decoder in accordance with a possible embodiment of the disclosure.

FIG. 4 illustrates an exemplary block diagram of a speech parameter decoder 290 in accordance with a possible embodiment of the disclosure. The speech parameter decoder 290 may include bit unpacking/lost frame interface 410, decoding modules 420, history registers 430, and select/interpolate modules 440.

The speech parameter decoder 290 may create the four parameter inputs that represent the speech production model for the speech synthesizer 280 (such as the speech synthesizer 280 shown as an example in FIG. 3) in order for the speech synthesizer to create sound. In the case where the real parameter data was not received, the speech parameter decoder 290 must make its best guess of what the value were likely to have been and decode them into real actual speech.

The bit unpacking/lost frame interface 410 may receive an incoming frame and unpack it. If an expected frame is not received, the bit unpacking/lost frame interface 410 may set the frame loss flag and send it to the loss history register. The decoding modules 420 may include LSF, VCUT, pitch, and RMS decoding modules. These parameters are necessary to control the speech synthesizer 280, such as a TDVC speech synthesizer.

For example, the parameters that may be decoded (1) Spectral parameters, in the form of line spectral frequencies (LSF), for example. There may be ten of these transmitted for each frame; they are vector quantized using a multi-stage quantizer. (2) voicing cutoff frequency, a 3-bit number (0-7) that may represent the transition point between voiced and unvoiced excitation in the frequency domain. (3) Fundamental pitch, the length (in samples) of the pitch period for voiced speech, for example. (4) The root mean squared (RMS) gain signal level for the frame. These parameters may be input to the speech synthesizer 280 which may create a speech signal, for example.

The history registers 430 may include a loss history register, a line spectral frequency (LSF) history register, a voicing cutoff (VCUT) history register, a pitch history register, and a root mean squared (RMS) gain history register. The loss history register, the LSF history register, the VCUT history register, the pitch history register, and the RMS history register may then include at least three registers, namely a newest, middle and oldest registers.

The select/interpolate modules 440 may average the values of two or more of the registers for each parameter. The output of the select/interpolate modules 440 to forwarded to the speech synthesizer 280.

For illustrative purposes, the operations and functions of the fill frame generator 295, and in particular, the speech synthesizer 280 and the VoIP decoder 290 will be discussed in relation to FIGS. 1-4, above.

Figure 5:
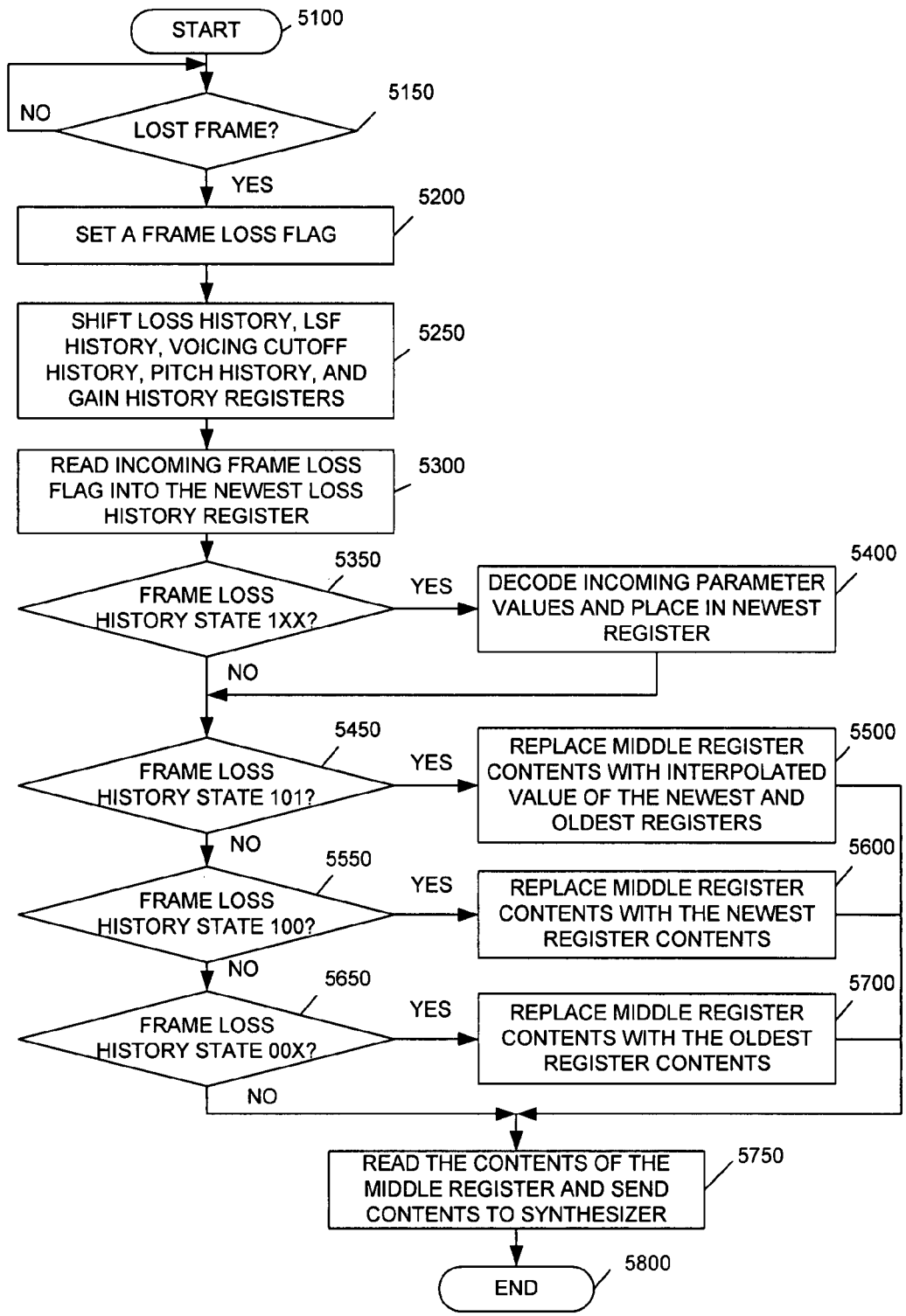
FIG. 5 is an exemplary flowchart illustrating a possible process for generating fill frames for Voice over Internet Protocol (VoIP) applications in accordance with one possible embodiment of the disclosure.

FIG. 5 is an exemplary flowchart illustrating a possible process for generating fill frames for VoIP applications in a communication device in accordance with one possible embodiment of the disclosure. The process begins at step 5100 and continues to step 5150 where the speech parameter decoder 290 determines if there is a lost frame in a received communication. If the speech parameter decoder 290 determines that there is a lost frame, at step 5200, the speech parameter decoder 290 sets a frame loss flag and stores the frame loss flag in the frame loss history register. Otherwise, the process returns to step 5150.

At step 5250, the speech parameter decoder 290 may shift a loss history register, a line spectral frequency (LSF) history register, a voicing cutoff (VCUT) history register, a pitch history register, and a root mean squared (RMS) gain history register. As stated above, the loss history register, the LSF history register, the VCUT history register, the pitch history register, and the RMS history register each include at least three registers, namely a newest, middle, and oldest registers.

At step 5300, the speech parameter decoder 290 reads the frame loss flag into a newest loss history register. At steps 5450, 5550, and 5650, the speech parameter decoder 290 may determine the contents of the middle register of each of the LSF history register, the VCUT history register, the pitch history register, and the RMS history register based on the contents of the frame loss history flags. The frame loss history flags may contain three values that may represent the frame loss state of the previous three frames. For example, the values may be represented by binary numbers such that a value of "0" indicates a lost frame and a value of "1" indicates a received frame. The three loss history flags may be read from the loss history registers (in FIG. 4) from left to right and may be concatenated into a three-digit binary number representing the loss state over the previous three frames. For example, a loss state of 101 indicates that the most current and oldest frames were correctly received, while the middle frame was lost. Likewise, a loss state of 100 indicates the current frame was received, while the middle and oldest frames were lost.

In the following discussion, the symbol "X", when used as a place-holder in the three-digit binary loss state number, indicates a "don't care" value. For example, when a loss state is given as "1XX", the most recent frame was received correctly, and the state of the middle and oldest frames does not matter for the particular step in the algorithm being described.

In particular, at step 5350, the speech parameter decoder 290 determines if the frame loss state is represented by 1XX. If the speech parameter decoder 290 determines if the frame loss state is represented by 1XX, at step 5400, the speech parameter decoder 290 decodes the LSF, VCUT, pitch, and RMS values, and places the decoded LSF, VCUT, pitch, and RMS values into the respective LSF, VCUT, pitch, and RMS newest registers. The process then goes to step 5450.

If at step 5350, the speech parameter decoder 290 determines if the frame loss state is not represented by 1XX, the process goes to step 5450 where the speech parameter decoder 290 determines if the frame loss state is set at 101. If the speech parameter decoder 290 determines that the frame loss state is set at 101, at step 5500, the speech parameter decoder 290 determines the average (or interpolated value) of the values stored in the newest and the oldest registers of the LSF, VCUT, pitch, and RMS registers. The speech parameter decoder 290 then replaces the contents of the LSF, VCUT, pitch, and RMS middle registers with the determined average values. The process then goes to step 5750.

If at step 5450, the speech parameter decoder 290 determines if the frame loss state is not set at 101, the process goes to step 5550 where the speech parameter decoder 290 determines if the frame loss state is set at 100. If the speech parameter decoder 290 determines that the frame loss state is set at 100, at step 5600, the speech parameter decoder 290 replaces the contents of the LSF, VCUT, pitch, and RMS middle registers with the contents of the newest register of the LSF, VCUT, pitch, and RMS registers. The process then goes to step 5750.

If at step 5550, the speech parameter decoder 290 determines if the frame loss state is not set at 100, the process goes to step 5650 where the speech parameter decoder 290 determines if the frame loss state is represented by 00X. If the speech parameter decoder 290 determines that the frame loss state is represented by 00X, at step 5700, the speech parameter decoder 290 replaces the contents of the LSF, VCUT, pitch, and RMS middle registers with the contents of the oldest register of the LSF, VCUT, pitch, and RMS registers. The process then goes to step 5750.

At step 5750, the speech parameter decoder 290 reads the contents of the middle registers and sends those contents to the synthesizer 280 to generate an output speech signal. The process then goes to step 5800 and ends.

If at step 5650, the speech parameter decoder 290 determines if the frame loss state is not represented by 00X, the process goes to step 5750. Arrival at step 5750 via this route indicates that the frame loss state can be represented by X1X, e.g. the middle frame of the history buffer was received correctly. Because the middle frame has been correctly received, the speech parameter decoder 290 proceeds with step 5750 and sends the contents of the middle registers to the synthesizer 280 to generate an output speech signal. The process then goes to step 5800 and ends.

After completion of the process, the "middle" register for each parameter will always contain data that was valid when received. Also note that the process is designed so that a copy of valid data will remain in the "oldest" register indefinitely, even if no future valid data is received.

In addition, if frame (or packet) reception abruptly stops, the steps described above will essentially propagate the last received frame data indefinitely. This may produce an annoying artifact if it happens during active speech. The artifact may either sound like a sustained buzzing or whooshing noise, for example. To counteract this problem, the speech parameter decoder 290 may count the number of sequential frame loss conditions. If the count reaches 4 or more, then the speech parameter decoder 290 multiples the held-over gain value by 0.25 for each successive lost frame. Once the count reaches 8 or higher, the speech parameter decoder sets the gain value to zero, effectively muting the output.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the fill frame generator 295 or it components in FIGS. 2-4 each processing the content in various possible ways. It does not necessarily need to be one system used by all end users. Accordingly, the appended claims and their legal equivalents should only define the disclosure, rather than any specific examples given.

We claim:

1. A method for generating fill frames for Voice over Internet Protocol (VoIP) applications in a communication device, comprising:

determining if there is a lost frame in a received communication, wherein if it is determined that there is a lost frame, setting a frame loss flag and storing the frame loss flag in the frame loss history register;

shifting a loss history register, a line spectral frequency (LSF) history register, a voicing cutoff (VCUT) history register, a pitch history register, and a root mean squared (RMS) gain history register, wherein the loss history register, the LSF history register, the VCUT history register, the pitch history register, and the RMS history register include at least three registers, the three registers being a newest, a middle and an oldest registers;

reading the frame loss flag into a newest loss history register;

determining contents of the middle register of each of the LSF history register, the VCUT history register, the pitch history register, and the RMS history register according to a state of the frame loss history register, wherein the frame loss history state is represented by a three digit binary number, the three digits representing a frame loss state of a previous three frames, a value of "0" indicating a lost frame, a value of "1" indicating a received frame, with a symbol "X" indicating one of a received frame and a lost frame, the value of which does not bear on the middle register contents, and wherein an average of the previous and future frame values are used if the frame loss history state is 101, the value of the previous frame is used if the frame loss history state is 001, and the value of the future frame is used if the frame loss history state is 100; and sending the contents of the middle registers to a synthesizer to generate an output speech signal.

2. The method of claim 1, wherein if the frame loss state is represented by 1XX, further comprising:

decoding the LSF, VCUT, pitch, and RMS values;

placing the decoded LSF, VCUT, pitch, and RMS values into the respective LSF, VCUT, pitch, and RMS newest registers.

3. The method of claim 1, wherein if the frame loss state is set at 101, further comprising:

determining the average value of the values stored in the newest and the oldest registers of the LSF, VCUT, pitch, and RMS registers;

replacing the contents of the LSF, VCUT, pitch, and RMS middle registers with the determined average values.

4. The method of claim 1, wherein if the frame loss state is set at 100, further comprising:

replacing the contents of the LSF, VCUT, pitch, and RMS middle registers with the contents of the newest register of the LSF, VCUT, pitch, and RMS registers.

5. The method of claim 1, wherein if the frame loss state can be represented by 00X, further comprising:

replacing the contents of the LSF, VCUT, pitch, and RMS middle registers with the contents of the oldest register of the LSF, VCUT, pitch, and RMS registers.

6. The method of claim 1, further comprising:

counting a number of consecutive lost frames, wherein if the number of consecutive lost frames is at least four, then multiplying the gain value for each successive lost frame by 0.25, wherein if the number of lost frames is at least eight, then setting the RMS value equal to zero.

7. A non-transitory computer-readable medium storing instructions for generating fill frames for Voice over Internet Protocol (VoIP) applications that when executed by a communication device cause the communication device to:

determining if there is a lost frame in a received communication, wherein if it is determined that there is a lost frame, setting a frame loss flag and storing the frame loss flag in the frame loss history register;

shifting a loss history register, a line spectral frequency (LSF) history register, a voicing cutoff (VCUT) history register, a pitch history register, and a root mean squared (RMS) gain history register, wherein the loss history register, the LSF history register, the VCUT history register, the pitch history register, and the RMS history register include at least three registers, the three registers being a newest, a middle and an oldest registers;

reading the frame loss flag into a newest loss history register;

determining contents of the middle register of each of the LSF history register, the VCUT history register, the pitch history register, and the RMS history according to a state of the frame loss history register; and wherein the frame loss history state is represented by a three digit binary number, the three digits representing a frame loss state of a previous three frames, a value of "0" indicating a lost frame, a value of "1" indicating a received frame, with a symbol "X" indicating one of a received frame and a lost frame, the value of which does not bear on the middle register contents, wherein an average of the previous and future frame values are used if the frame loss history state is 101, the value of the previous frame is used if the frame loss history state is 001, and the value of the future frame is used if the frame loss history state is 100; and sending the contents of the middle registers to a synthesizer to generate an output speech signal.

8. The computer-readable medium of claim 7, wherein if the frame loss state is represented by 1XX, further comprising:
decoding the LSF, VCUT, pitch, and RMS values;
placing the decoded LSF, VCUT, pitch, and RMS values into the respective LSF, VCUT, pitch, and RMS newest registers.

9. The computer-readable medium of claim 7, wherein if the frame loss state is set at 101, further comprising:
determining the average value of the values stored in the newest and the oldest registers of the LSF, VCUT, pitch, and RMS registers;
replacing the contents of the LSF, VCUT, pitch, and RMS middle registers with the determined average values.

10. The computer-readable medium of claim 7, wherein if the frame loss state is set at 100, further comprising:
replacing the contents of the LSF, VCUT, pitch, and RMS middle registers with the contents of the newest register of the LSF, VCUT, pitch, and RMS registers.

11. The computer-readable medium of claim 7, wherein if the frame loss state is represented by 00X, further comprising:
replacing the contents of the LSF, VCUT, pitch, and RMS middle registers with the contents of the oldest register of the LSF, VCUT, pitch, and RMS registers.

12. The computer-readable medium of claim 7, further comprising:
counting a number of consecutive lost frames, wherein if the number of consecutive lost frames is at least four, then
multiplying the gain value for each successive lost frame by 0.25, wherein if the number of lost frames is at least eight, then
setting the RMS value equal to zero.

13. A fill frame generator that generates fill frames for Voice over Internet Protocol (VoIP) applications in a communication device, comprising:
a synthesizer that generates an output speech signal;
a frame loss history register, the frame lost history register including newest, middle and oldest registers;
a line spectral frequency (LSF) history register, the LSF history register including newest, middle and oldest registers;
a voicing cutoff (VCUT) history register, the VCUT history register including newest, middle and oldest registers;
a pitch history register, the pitch history register including newest, middle and oldest registers;
a root mean squared (RMS) gain history register, the RMS history register including newest, middle and oldest registers; and
a speech parameter decoder that determines if there is a lost frame in a received communication, wherein if the speech parameter decoder determines that there is a lost frame, the speech parameter decoder sets a frame loss flag and stores the frame loss flag in the frame loss history register, shifts the frame loss history register, the LSF history register, the VCUT history register, the pitch history register, and the RMS history register, reads the frame loss flag into a newest frame loss history register, determines contents of the middle register of each of the LSF history register, the VCUT history register, the pitch history register, and the RMS history register according to a state of the frame loss history register, and sends the contents of the middle registers to the synthesizer, wherein the synthesizer generates an output speech signal wherein the frame loss history state is represented by a three digit binary number, the three digits representing a frame loss state of a previous three frames, a value of "0" indicating a lost frame, a value of "1" indicating a received frame, with a symbol "X" indicating one of a received frame and a lost frame, the value of which does not bear on the middle register contents, and wherein an average of the previous and future frame values are used if the frame loss history state is 101, the value of the previous frame is used if the frame loss history state is 001, and the value of the future frame is used if the frame loss history state is 100.

14. The fill frame generator of claim 13, wherein if the frame loss state is represented by 1XX, the speech parameter decoder decodes the LSF, VCUT, pitch, and RMS values, and places the decoded LSF, VCUT, pitch, and RMS values into the respective LSF, VCUT, pitch, and RMS newest registers.

15. The fill frame generator of claim 13, wherein if the frame loss state is set at 101, the speech parameter decoder determines the average value of the values stored in the newest and the oldest registers of the LSF, VCUT, pitch, and RMS registers, and replaces the contents of the LSF, VCUT, pitch, and RMS middle registers with the determined average values.

16. The fill frame generator of claim 13, wherein if the frame loss state is set at 100, the speech parameter decoder replaces the contents of the LSF, VCUT, pitch, and RMS middle registers with the contents of the newest register of the LSF, VCUT, pitch, and RMS registers.

17. The fill frame generator of claim 13, wherein if the frame loss flag is represented by 00X, the speech parameter decoder replaces the contents of the LSF, VCUT, pitch, and RMS middle registers with the contents of the oldest register of the LSF, VCUT, pitch, and RMS registers.

18. The fill frame generator of claim 13, wherein the speech parameter decoder counts a number of consecutive lost frames, wherein if the number of consecutive lost frames is at least four, the speech parameter decoder multiplies the gain value for each successive lost frame by 0.25, wherein if the number of lost frames is at least eight, then the speech parameter decoder sets the RMS value equal to zero.

* * * * *